Patented Oct. 13, 1925.

1,557,266

UNITED STATES PATENT OFFICE.

WILLIAM C. MOORE, OF BALTIMORE, MARYLAND, ASSIGNOR TO U. S. INDUSTRIAL ALCOHOL CO., A CORPORATION OF WEST VIRGINIA.

COMPOSITION ADAPTED TO GENERATE FREE IODINE.

No Drawing. Application filed December 27, 1922. Serial No. 609,341.

*To all whom it may concern:*

Be it known that I, WILLIAM C. MOORE, a citizen of the United States, a resident of Baltimore and State of Maryland, have invented certain new and useful Improvements in Composition Adapted to Generate Free Iodine, of which the following is a specification.

My invention relates to a composition adapted to be used in various forms and which acts as an antiseptic, germicide, disinfectant and astringent, etc., by the liberation of iodine when desired, but which will normally remain substantially unchanged without the liberation of the iodine.

The object of my invention is to provide a composition of this character which may be used for many different purposes and in many different forms as, for example, as a powder, a tablet, or a styptic pencil, and which is of such a character that under ordinary atmospheric conditions there will be substantially no loss of the iodine therefrom, but which will immediately liberate iodine, when desired, in effective quantities and in an active form by the mere contact of water therewith. A further object is to provide for this purpose a composition containing an iodide and an iodate, but preferably potassium iodide and potassium iodate, together with a salt that is capable of acting upon the iodine compounds, to release the iodine therefrom, in the presence of the water but will not act thereon in a dry state. Preferably, furthermore, the object of my invention is to utilize a dehydrated salt for this purpose, as in this way a more stable composition is obtained. If desired, furthermore, I may add other constituents such, for example, as potassium carbonate, which will act as a stabilizer by taking up any minute quantities of free acid that may be formed and which will have the effect, also, of increasing the size of the composition to increase the facility of handling, as well as the solubility of the composition in water. Other objects of my invention will appear from the detailed description of the same hereinafter.

While my invention is capable of being carried out in many different ways for the purpose of illustration I shall describe only certain ways of carrying out the same hereinafter.

For example, I may produce a composition in accordance with the invention by adding iodine to a concentrated aqueous solution of potassium hydroxide until the solution obtains a dark red color. This solution may be obtained by adding between 650 and 700 grams of c. p. iodine to 327 grams of potassium hydroxide in concentrated aqueous solution. These proportions may be widely varied if desired, however. The resulting solution, together with any precipitate, is evaporated to dryness and the solid residue obtained is then dried. If desired, instead of producing the iodide and iodate in this way, correct proportions of potassium iodide and iodate in chemically pure form may be directly mixed together. I may then prepare a dehydrated aluminum sulfate by at least partially dehydrating the crystalline aluminum sulfate, $Al_2(SO_4)_3.18 H_2O$, at a temperature preferably of not less than 100° C., and preferably for a period of not less than twenty-five hours. This will probably result in liberating the most of the water of crystallization and leaving approximately the compound, $Al_2(SO_4)_3.5H_2O$. An amount of the dehydrated aluminum sulfate is used which is equal in weight to approximately one-half of the total weight of the other constituents present in the composition. Instead of the iodide and iodate of potassium the iodide and iodate of sodium may be used, if desired. Also, instead of the iodate in any of these compositions, the per-iodate of potassium or sodium, $KIO_4$ or $NaIO_4$ may be used. Or instead other salts of the alkali metals containing iodine and oxygen may be used if desired. The potassium iodide and iodate are preferred however as they are the most stable when used with aluminum sulfate.

Again, if desired, instead of the aluminum sulfate, other salts that hydrolyze to form acids or acid salts may be used as, for example, zinc sulfate, magnesium sulfate, ferric sulfate, sodium di-acid phosphate, $NaH_2PO_4$, or potassium di-acid phosphate, $KH_2PO_4$.

Many types of fillers may be used. For instance, any suitable quantity of potassium carbonate may be added to increase the stability, solubility and bulk of the composition. For example, an amount of the potassium carbonate equal in weight to 5 to 10% of the aluminum sulfate, may be introduced. Or, instead, such soluble fillers may be used as potassium chloride, sodium chloride, sugar, and in addition such insoluble fillers may be used as talc, starch, in any desired quantity, or even an additional quantity of aluminum sulfate, may be introduced as a soluble filler.

This composition may be used in the form of a powder which will at once liberate a very large percentage of the iodine present when brought into contact with water. Instead, however, if desired, the powder may be compressed into tablet form. Again, if desired, the powder may be made into the form of a styptic pencil by pressure or in any other desired way. Also, if preferred, the powder may be put up in the form of capsules as, for example, capsules made from gelatine. In the case where the powder, tablet or capsule is to be used it is preferable at first to dissolve the same in a small amount of water, that is to say, about 50 parts by weight of water, preferably warm, to one gram of the composition and thereafter to add 500 c. c. of water, cold or warm, as desired, to produce a composition having a strength suitable for use as a disinfectant, germicide or antiseptic. In the case of the styptic pencil it is merely necessary to use it, as, for example, by rubbing a cut or slight wound therewith, the water present in the cut or wound being sufficient to liberate a large percentage of the iodine which will be extremely effective as an antiseptic. Also the aluminum compounds present will act as a causticizing agent.

While I have described my invention above in detail I wish it to be understood that many changes may be made therein without departing from the spirit of the same.

I claim:

1. A dry composition comprising a compound of iodine and an alkali metal, and a compound capable of acting thereon to liberate iodine.

2. A dry composition comprising an iodide of an alkali metal, a salt of an alkali metal containing iodine and oxygen and a substance that hydrolyzes to form an acidic agent capable of acting upon the same to liberate iodine.

3. A dry composition comprising iodide of potassium, a salt of potassium containing iodine and oxygen and a substance that hydrolyzes to form an acidic agent capable of acting upon the same to liberate iodine.

4. A dry composition comprising an iodide of an alkali metal, an iodate of an alkali metal and a substance that hydrolyzes to form an acidic agent capable of acting upon the same to liberate iodine.

5. A dry composition comprising iodide of potassium, potassium iodate and a substance that hydrolyzes to form an acidic agent capable of acting upon the same to liberate iodine.

6. A dry composition comprising an iodide of an alkali metal, a salt of an alkali metal containing iodine and oxygen and an anhydrous substance that hydrolyzes to form an acidic agent capable of acting upon the same to liberate iodine.

7. A dry composition comprising iodide of potassium, a salt of potassium containing iodine and oxygen and an anhydrous substance that hydrolyzes to form an acidic agent capable of acting upon the same to liberate iodine.

8. A dry composition comprising an iodide of an alkali metal, an iodate of an alkali metal and an anhydrous substance that hydrolyzes to form an acidic agent capable of acting upon the same to liberate iodine.

9. A dry composition comprising iodide of potassium, potassium iodate and an anhydrous substance that hydrolyzes to form an acidic agent capable of acting upon the same to liberate iodine.

10. A dry composition comprising an iodide of an alkali metal, a salt of an alkali metal containing iodine and oxygen and a dehydrated crystalline aluminum sulfate.

11. A dry composition comprising iodide of potassium, a salt of potassium containing iodide and oxygen and a dehydrated crystalline aluminum sulfate.

12. A dry composition comprising an iodide of an alkali metal, an iodate of an alkali metal and a dehydrated crystalline aluminum sulfate.

13. A dry composition comprising iodide of potassium, potassium iodate and a dehydrated crystalline aluminum sulfate.

14. A dry composition comprising an iodide of an alkali metal, a salt of an alkali metal containing iodine and oxygen and a partially dehydrated crystalline aluminum sulfate.

15. A dry composition comprising iodide of potassium, a salt of potassium containing iodide and oxygen and a partially dehydrated crystalline aluminum sulfate.

16. A dry composition comprising an iodide of an alkali metal, an iodate of an alkali metal and a partially dehydrated crystalline aluminum sulfate.

17. A dry composition comprising iodide of potassium, potassium iodate and a partially dehydrated crystalline aluminum sulfate.

18. A dry composition comprising an iodide of an alkali metal, a salt of an alkali metal containing iodine and oxygen, a substance that hydrolyzes to form an acidic agent capable of acting upon the same to liberate iodine, and a soluble filling material.

19. A dry composition comprising iodide of potassium, potassium iodate, a partially dehydrated crystalline aluminum sulfate, and a soluble filling material.

20. A dry composition comprising an iodide of an alkali metal, a salt of an alkali metal containing iodine and oxygen, a substance that hydrolyzes to form an acidic agent capable of acting upon the other constituents to liberate iodine, and potassium chloride.

21. A dry composition comprising iodide of potassium, potassium iodate, a partially dehydrated crystalline aluminum sulfate, and potassium chloride.

22. A dry composition in the form of a tablet comprising an iodide of an alkali metal, a salt of an alkali metal containing iodine and oxygen, and a substance that hydrolyzes to form an acidic agent capable of acting upon the other constituents to liberate iodine.

23. A dry composition in the form of a tablet comprising iodide of potassium, potassium iodate and a partially dehydrated crystalline aluminum sulfate.

24. A dry composition in the form of a tablet comprising an iodide of an alkali metal, a salt of an alkali metal containing iodine and oxygen, a substance that hydrolyzes to form an acidic agent capable of acting upon the other constituents to liberate iodine, and a soluble filling material.

25. A dry composition in the form of a tablet comprising iodide of potassium, potassium iodate, a partially dehydrated crystalline aluminum sulfate and potassium chloride.

26. A dry composition comprising an iodide of an alkali metal, a salt of an alkali metal containing iodine and oxygen, a substance that hydrolyzes to form an acidic agent capable of acting upon the same to liberate iodine, a soluble filling material and an insoluble filler.

27. A dry composition in the form of a tablet comprising an iodide of an alkali metal, a salt of an alkali metal containing iodine and oxygen, a substance that hydrolyzes to form an acidic agent capable of acting upon the other constituents to liberate iodine, a soluble filling material and an insoluble filler.

28. A dry composition comprising an iodide of an alkali metal, a salt of an alkali metal containing iodine and oxygen, a substance that hydrolyzes to form an acidic agent capable of acting upon the same to liberate iodine, a soluble filling material and talc.

29. A dry composition in the form of a tablet comprising an iodide of an alkali metal, a salt of an alkali metal containing iodine and oxygen, a substance that hydrolyzes to form an acidic agent capable of acting upon the other constituents to liberate iodine, a soluble filling material and talc.

In testimony that I claim the foregoing, I have hereunto set my hand this 28 day of November, 1922.

WILLIAM C. MOORE.